United States Patent
Maraslis et al.

(10) Patent No.: US 11,001,253 B2
(45) Date of Patent: May 11, 2021

(54) METHOD FOR MANEUVERING A MOTOR VEHICLE WITH MOVEMENT OF THE MOTOR VEHICLE INTO A DETECTION POSITION, DRIVER ASSISTANCE SYSTEM AND MOTOR VEHICLE

(71) Applicant: VALEO Schalter und Sensoren GmbH, Bietigheim-Bissingen (DE)

(72) Inventors: Christos Maraslis, Bietigheim-Bissingen (DE); Eduardo Menaka, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 376 days.

(21) Appl. No.: 15/771,691

(22) PCT Filed: Oct. 14, 2016

(86) PCT No.: PCT/EP2016/074789
§ 371 (c)(1),
(2) Date: Oct. 26, 2018

(87) PCT Pub. No.: WO2017/071979
PCT Pub. Date: May 4, 2017

(65) Prior Publication Data
US 2019/0047551 A1 Feb. 14, 2019

(30) Foreign Application Priority Data
Oct. 30, 2015 (DE) .................... 10 2015 118 578.4

(51) Int. Cl.
*B60W 30/06* (2006.01)
*B62D 15/02* (2006.01)
(Continued)

(52) U.S. Cl.
CPC ........ *B60W 30/06* (2013.01); *B60W 30/0956* (2013.01); *B60W 30/10* (2013.01);
(Continued)

(58) Field of Classification Search
None
See application file for complete search history.

(56) References Cited

U.S. PATENT DOCUMENTS

| 2013/0245877 A1 | 9/2013 | Ferguson et al. |
| 2017/0088052 A1* | 3/2017 | Nallapa .................. G01S 17/04 |
| 2017/0313306 A1* | 11/2017 | Nordbruch ......... B62D 15/0285 |

FOREIGN PATENT DOCUMENTS

| DE | 10 2012 007986 A1 | 10/2013 |
| DE | 10 2013 019145 A1 | 5/2015 |

(Continued)

OTHER PUBLICATIONS

International Search Report issued in PCT/EP2016/074789 dated Jan. 4, 2017 (6 pages).
(Continued)

*Primary Examiner* — Jonathan M Dager
*Assistant Examiner* — Garrett F Evans
(74) *Attorney, Agent, or Firm* — Osha Bergman Watanabe & Burton LLP

(57) ABSTRACT

The invention relates to a method for maneuvering a motor vehicle (1), in which the motor vehicle (1) is manoeuvred within a determined driving tube (15), during the maneuvering a position of at least one object (8, 9) in a surrounding area (7) of the motor vehicle (1) is continuously determined by means of a control unit (3) on the basis of sensor data of at least one sensor (4) of the motor vehicle (1), which sensor (4) has a predetermined detection range (10), and if the at least one object (8, 9) is located outside the detection range (10) of the at least one sensor (4), the position of the at least one object (8, 9) is estimated, wherein a sensing position is determined by means of the control unit (3), and the motor vehicle (1) is moved to the sensing position if the at least one object (8, 9) is located outside the detection range (10), wherein the sensing position is determined in such a way that the estimated position of the at least one object (8, 9) is located within the detection range (10) if the motor vehicle (1) is located at the sensing position.

15 Claims, 4 Drawing Sheets

(51) Int. Cl.
*B60W 30/095* (2012.01)
*B60W 30/10* (2006.01)
*B60W 40/04* (2006.01)
*B60W 50/14* (2020.01)

(52) U.S. Cl.
CPC ............ *B60W 40/04* (2013.01); *B60W 50/14* (2013.01); *B62D 15/0285* (2013.01); *B60W 2050/146* (2013.01); *B60W 2554/00* (2020.02); *B60W 2555/60* (2020.02)

(56) References Cited

FOREIGN PATENT DOCUMENTS

| | | |
|---|---|---|
| EP | 1 674 885 A1 | 6/2006 |
| EP | 1 668 385 B1 | 5/2007 |
| EP | 2 696 215 A2 | 2/2014 |
| JP | 2011-43884 A | 3/2011 |
| JP | 2013-530867 A | 8/2013 |
| JP | 2015-77936 A | 4/2015 |

OTHER PUBLICATIONS

Written Opinion issued in PCT/EP2016/074789 dated Jan. 4, 2017 (7 pages).
German Search Report issued in 10 2015 118 578.4 prepared on Aug. 5, 2016 (10 pages).
The Notification of Reasons for Refusal issued in corresponding Japanese Application No. 2018-521869, dated Jun. 18, 2019 (6 pages).

\* cited by examiner

METHOD FOR MANEUVERING A MOTOR VEHICLE WITH MOVEMENT OF THE MOTOR VEHICLE INTO A DETECTION POSITION, DRIVER ASSISTANCE SYSTEM AND MOTOR VEHICLE

The present invention relates to a method for maneuvering a motor vehicle, in which the motor vehicle is manoeuvred within a determined driving tube, during the maneuvering a position of at least one object in a surrounding area of the motor vehicle is continuously determined by means of a control unit on the basis of sensor data of at least one sensor of the motor vehicle, which sensor has a predetermined detection range, and if the at least one object is located outside the detection range of the at least one sensor, the position of the at least one object is estimated. Furthermore, the present invention relates to a driver assistance system for a motor vehicle. Finally, the present invention relates to a motor vehicle.

The interest here is in, in particular, driver assistance systems for motor vehicles which assist the driver when maneuvering the motor vehicle. For example, driver assistance systems are known by means of which the motor vehicle can be parked autonomously or automatically in a parking space. In addition, according to the prior art there are driver assistance systems which automatically carry out an emergency braking operation if there is a risk of a collision between the motor vehicle and an object or an obstacle. In this context, the driver assistance systems are increasingly operated on the basis of a digital map of the surroundings which describes the surrounding area of the motor vehicle. This map of the surroundings includes information about the objects in the surrounding area of the motor vehicle that have been detected with the sensors of the driver assistance system. The sensors can be, for example, ultrasonic sensors, cameras, radar sensors, laser scanners or the like. The positions of the object are determined in the digital map of the surroundings by means of different approaches, for example by means of triangulation. The driver assistance system can carry out various actions through knowledge of the position of the objects.

The motor vehicle can then be manoeuvred autonomously or automatically using the sensor data which is made available with the sensors. This includes, for example in the case of parking systems, the automatic longitudinal guidance and transverse guidance of the motor vehicle. In addition, an automatic gear selection can be made and there can be provision that a parking brake is used. Furthermore, driver assistance systems are known which autonomously guide the motor vehicle around objects or obstacles into a target position, for example into a garage or an entry or through a narrow passage, using the surroundings sensor system. For this purpose, a driving tube in which the motor vehicle can be moved without collisions can be determined with the driver assistance system.

The sensors of the driver assistance system each have a detection range. This detection range describes the range in which an object can be sensed with the respective sensor. Depending on the position and orientation of the sensor, what are referred to as blind spots, in which an object can no longer be sensed, can form in a close region around the vehicle contour. For this purpose, it is known from the prior art to track the position of the object taking into account the movement of the motor vehicle itself and the speed of the actual objects. In this context, EP 1 668 385 B1 describes a method for identifying the projected distance between a distance-measuring device and an obstacle. For this purpose, a limiting time point is determined which describes when that point of an obstacle which is closest to the distance-measuring device disappears from the detection range of the distance-measuring device. The projected distance can then be determined on the basis of information about the relative movement of the distance-measuring device and of the obstacle.

A significant disadvantage with the known methods is that objects in the blind spot of the sensor cannot be subsequently measured and for this reason it is not known whether the object is located within a predetermined driving tube in which the motor vehicle is manoeuvred or has already exited said tube. Therefore, the motor vehicle cannot be reliably manoeuvred without a collision. Furthermore, it can be the case that the motor vehicle comes to a stop before an object with which there is a risk of collision. If an object migrates into the blind spot of the sensor as a result of the movement of the motor vehicle itself or the movement of the actual object, it cannot be checked with certainty whether the object has exited the driving tube of the motor vehicle. The motor vehicle therefore cannot be manoeuvred with the necessary safety.

An object of the present invention is to disclose a solution for permitting a motor vehicle to be manoeuvred more reliably on the basis of the data of at least one sensor.

This object is achieved according to the invention by means of a method, by means of a driver assistance system and by means of a motor vehicle having the features according to the respective independent claims. Advantageous developments of the present invention are the subject matter of the dependent claims, of the description and of the figures.

A method according to the invention serves to manoeuvre a motor vehicle. In this context, the motor vehicle is manoeuvred within a determined driving tube. During the maneuvering a position of at least one object in a surrounding area of the motor vehicle is continuously determined by means of a control unit on the basis of sensor data of at least one sensor of the motor vehicle, which sensor has a predetermined detection range. If the at least one object is located outside the detection range of the at least one sensor, the position of the at least one object is estimated. In addition, a sensing position is determined by means of the control unit, and the motor vehicle is moved to the sensing position if the at least one object is located outside the detection range. In this context, the sensing position is determined in such a way that the estimated position of the at least one object is located within the detection range if the motor vehicle is located at the sensing position.

The motor vehicle is to be manoeuvred here using a control unit of a driver assistance system. The control unit can be, for example, an electronic control unit (ECU) of the motor vehicle. In addition, the driver assistance system comprises at least one sensor which can be embodied, for example, as an ultrasonic sensor, radar sensor, laser scanner, lidar sensor, camera or the like. There is preferably provision that the driver assistance system comprises a multiplicity of sensors which are arranged, for example, distributed on the motor vehicle. The at least one sensor can be connected to the control unit for the transmission of data. In this way, sensor data of the sensor can be be received with the control unit. The sensor data of the sensor can include, in particular, distance information which describes the distance between the motor vehicle and the at least one object. Therefore, the position of the at least one object or the relative location between the motor vehicle and the at least one object can be determined by means of the control unit on the basis of the sensor data. The motor vehicle is manoeuvred within a determined driving tube. This driving tube can be determined, for example, by means of the control unit on the basis of the position of the at least one object. For this purpose, the control unit can use the sensor data and plan the driving tube in such a way that the motor vehicle can be manoeuvred without a collision. During the travel within the driving tube, the position of the at least one object is determined continuously on the basis of the sensor data. The determination of the position of the at least one object is possible if the at least one object is located in the detection range of the sensor. The detection range describes that area in the surrounding area of the motor vehicle in which objects or obstacles can be sensed with the sensor. On the basis of the sensor data it is possible to check whether the object is located in the detection range of the sensor. It is therefore possible to detect a situation in which the at least one object is initially arranged in the detection range of the motor vehicle and, for example, exits the detection range during the movement of the motor vehicle and/or of the object.

If the at least one object is not located, or is no longer located, in the detection range of the at least one sensor, the position of the at least one object can be estimated by means of the control unit. For example the movement of the motor vehicle can be used for this. In particular, the current speed and/or the current direction of travel of the motor vehicle can be used to estimate the position of the at least one object which is located outside the detection range. In addition, on the basis of the sensor data it is possible to determine whether the object is a stationary object or a moving object. Furthermore, the relative movement between the motor vehicle and the at least one object can be determined and taken into account during the estimation of the position. Although the position of the motor vehicle is estimated, this position can no longer be determined with the necessary certainty. In the worst case this can lead to a situation in which a collision takes place between the motor vehicle and the at least one object.

According to the invention there is now provision that a sensing position is determined by means of the control unit, and the motor vehicle is moved to the sensing position if the at least one object is located outside the detection range. In other words, by means of the control unit, the maneuvering of the motor vehicle within the driving tube is interrupted and an additional driving manoeuvre is carried out during which the motor vehicle is moved to the sensing position. The sensing position is selected here in such a way that the estimated position of the object is located within the detection range of the sensor if the motor vehicle is located in the sensing position. It therefore becomes possible to measure the at least one object subsequently in that the motor vehicle is moved in such a way that the last position or the assumed location of the at least one object is brought within the detection range of the sensor again. In this way it becomes possible to determine the current position of the object reliably using the sensor. As a result, a collision between the motor vehicle and the at least one object can be prevented. In addition the manoeuvre can be continued if it is detected that further travel in the driving tube without a collision is possible.

The motor vehicle is preferably moved to the sensing position if the at least one object is located in a predetermined blind spot of the at least one sensor which is arranged between the detection range and an external surface of the motor vehicle. The detection range of the sensor can extend, for example, in a cone shape proceeding from the sensor. What is referred to as the blind spot, in which the at least one object cannot be sensed, or cannot be sensed completely, with the sensor, is arranged between this detection range and the external surface or an outer shell of the motor vehicle. This is the case, in particular, when the object is a low object which has a height which is less than an installation height of the sensor. If the motor vehicle is, for example, moved towards the object during the travel within the driving tube, it may be the case that the at least one object is firstly arranged in the detection range of the sensor and subsequently disappears from the detection range. In this case, the at least one object is usually very close to the motor vehicle. It can also occur that an emergency braking operation is carried out with the driver assistance system, since there is a risk of a collision with the object. After the braking operation has been carried out, the object can be very close to the motor vehicle. In order to able to sense the object, the motor vehicle is moved into the sensing position. A possible collision with the object can thus be avoided.

In one refinement, the motor vehicle is moved in the opposite direction of travel to the sensing position within the determined driving tube. For example, there can be provision that during the maneuvering the motor vehicle is moved in a first direction of travel within the driving tube. In order to move the motor vehicle to the sensing position, there can be provision that the motor vehicle is moved in a second direction of travel, opposite to the first direction of travel, within the driving tube. The motor vehicle is therefore initially moved within the driving tube. If the at least one object moves into the blind spot or is arranged outside the detection range, the motor vehicle can be stopped. Thereafter, the motor vehicle can be moved back along the driving tube until it reaches the sensing position. The sensing position can therefore be easily determined.

In a further embodiment, the sensing position is determined as a function of a relative location of the motor vehicle with respect to the at least one object and the detection range of the at least one sensor. For example, the sensor data which describe the object at the time at which it was still located in the detection range of the sensor can be evaluated with the control unit. On the basis of this sensor data, the relative location of the motor vehicle or of the sensor with respect to the object can then be determined. In addition, the installation location and the detection range of the sensor can be taken into account in order to determine the sensing position. If the object is a moving object, the movement of the object can also be estimated within the blind spot. The sensing position can therefore be determined reliably, and it can be ensured that the object can, as it were, be subsequently measured if the motor vehicle is located at the sensing position.

In a further embodiment, at the sensing position the sensor data is used to check, during a predetermined time period, whether the at least one object is arranged within the determined driving tube. If the motor vehicle is located at the sensing position, chronologically successive measuring cycles can be carried out with the sensor during a predetermined time period. In each of the measuring cycles the sensor data can be determined and transmitted to the control unit. It is therefore possible to check by means of the control unit during the predetermined time period whether the object is located within the detection range or not. In addition it can be investigated whether the object is a stationary object or a moving object, for example, which is moving out of the driving tube. It is therefore possible to reliably check whether there is a risk of a collision with the object or not during a subsequent movement of the motor vehicle within the driving tube.

In one embodiment, the motor vehicle is moved further within the determined driving tube if the at least one object is not arranged in the determined driving tube. If the motor vehicle is located at the sensing position, it is checked whether the at least one object is arranged within the driving tube. If this is not the case, the movement of the motor vehicle can be continued along the determined driving tube, since there is no risk of a collision with the object. There can also be provision here that the motor vehicle is firstly moved back from the sensing position into the driving tube, and after this the travel along the driving tube is continued. The motor vehicle can thus be manoeuvred safely and reliably.

In a further refinement, a changed driving tube is determined and the motor vehicle is moved within the changed driving tube if the at least one object is arranged in the determined driving tube. If it has been detected at the sensing position that the object is located within the originally planned driving tube, a changed driving tube can be determined. In particular, this changed driving tube is determined in such a way that a collision between the motor vehicle and the at least one object does not occur. For example, the changed driving tube can be determined in such a way that during the travel within the driving tube the motor vehicle is moved past the object. The changed driving tube can also be determined in such a way that the motor vehicle is moved in the direction of the object, and the motor vehicle is stopped at a predetermined minimum distance before the object. This can be the case, for example, if the object is to be parked in a parking space during the movement along the determined driving tube, and the at least one object is located within the parking space. In this context, it may be possible, for example, for the motor vehicle to be moved into the parking space and for the travel of the motor vehicle to be ended at the minimum distance from the object if the parking space is sufficiently large.

Furthermore, it is advantageous if an output is output to the driver of the motor vehicle if the at least one object is arranged in the determined driving tube. The driver assistance system can have a corresponding output device with which an output or a warning message can be output visually, acoustically and/or haptically to the driver of the motor vehicle. The driver can therefore be informed, for example, that an object is located within the determined driving tube and a changed driving tube is determined. It is also possible to provide that in the case of at least semi-autonomous maneuvering of the motor vehicle the maneuvering is aborted and the driver assistance system transfers control to the driver. In this case, a corresponding output can be issued. Basically, there can also be provision that corresponding information is output to the driver with the output device to the effect that the motor vehicle is moved in the sensing position. Therefore, in particular in the case of semi-autonomous maneuvering the driver of the motor vehicle is informed continuously.

The motor vehicle is preferably manoeuvred at least semi-autonomously within the determined driving tube by means of the control unit. As already explained, the maneuvering of the motor vehicle within the determined driving tube takes place at least semi-autonomously. In this context, the driver assistance system can assume control of the intervention into the steering system and the driver of the motor vehicle is also assigned the activation of the accelerator pedal and the brake. Alternatively, the motor vehicle can be manoeuvred fully autonomously or automatically along the driving tube. In this case, the driver assistance system also assumes control of the intervention into a drive engine of the motor vehicle and the brake system.

In a further embodiment a control signal is received from a motor-vehicle-external operator control unit by means of the control unit, and the motor vehicle is manoeuvred within the determined driving tube as a function of the received control signal. Basically, an expansion of the maneuvering of the motor vehicle is possible by means of a motor-vehicle-external operator control unit or a remote control system. The vehicle-external operator control unit can be formed, for example, by a smartphone, a radio key or the like. In this case, the driver of the motor vehicle operates the operator control unit, for example. Corresponding control signals are generated by the operator control unit on the basis of the operator control inputs by the driver, and are transmitted to the control unit of the motor vehicle. The motor vehicle can then be manoeuvred by means of the control unit. Such a remote control system is conceivable, for example, when the motor vehicle is moved into a parking space or removed from a parking space. This is advantageous, in particular, if the parking space is spatially limited and the entry or exiting into or from the vehicle is possible for the driver only with difficulty.

The position of the at least one object is preferably input into a digital map of the surroundings which describes the surrounding area of the motor vehicle. The position of the at least one object or the relative location between the motor vehicle and the object can be determined by means of the control unit on the basis of the sensor data. This information can be input into the digital map of the surroundings. For example, the relative location between the motor vehicle and the object can be determined with respect to a reference point of the motor vehicle. If the driver assistance system has a plurality of sensors and/or a plurality of different sensors, the position of the at least one object can be determined with each of the sensors and input into the map of the surroundings.

A control unit according to the invention for a driver assistance system of a motor vehicle is designed to carry out a method according to the invention. The control unit can be formed, for example, by an electronic control unit of the motor vehicle. Alternatively, the control unit can be formed by a digital signal processor, a microprocessor or some other computer.

A driver assistance system according to the invention for a motor vehicle comprises a control unit according to the invention and at least one sensor. The driver assistance system preferably comprises a multiplicity of sensors which are arranged, for example, distributed on the motor vehicle. The sensors can also be connected to the control unit via a special vehicle data bus for the transmission of data. The driver assistance system can be embodied, for example, as a parking aid, as an emergency braking assistant or the like.

A motor vehicle according to the invention comprises a driver assistance system according to the invention. The motor vehicle is embodied, in particular, as a passenger car.

The preferred embodiments which are presented with respect to the method according to the invention, and the advantages thereof, apply correspondingly to the control unit according to the invention, the driver assistance system according to the invention and the motor vehicle according to the invention.

Further features of the invention are apparent from the claims, the figures and the description of the figures. The features and combinations of features which are specified above in the description and the features and combinations of features which are specified below in the description of the figures and/or shown solely in the figures can be used not only in the respectively indicated combination but also in other combinations or alone without departing from the scope of the invention. Embodiments of the invention which are not explicitly shown in the figures or explained, but arise and can be generated by separate combinations of features from the explained embodiments are therefore also to be considered as included and disclosed. Embodiments and combinations of features which therefore do not have all the features of an originally formulated independent claim are also to be considered as disclosed.

The invention will now be explained in more detail on the basis of preferred exemplary embodiments and with reference to the appended drawings, in which.

Identical and functionally identical elements are provided with the same reference symbols in the figures.

Figure 1:
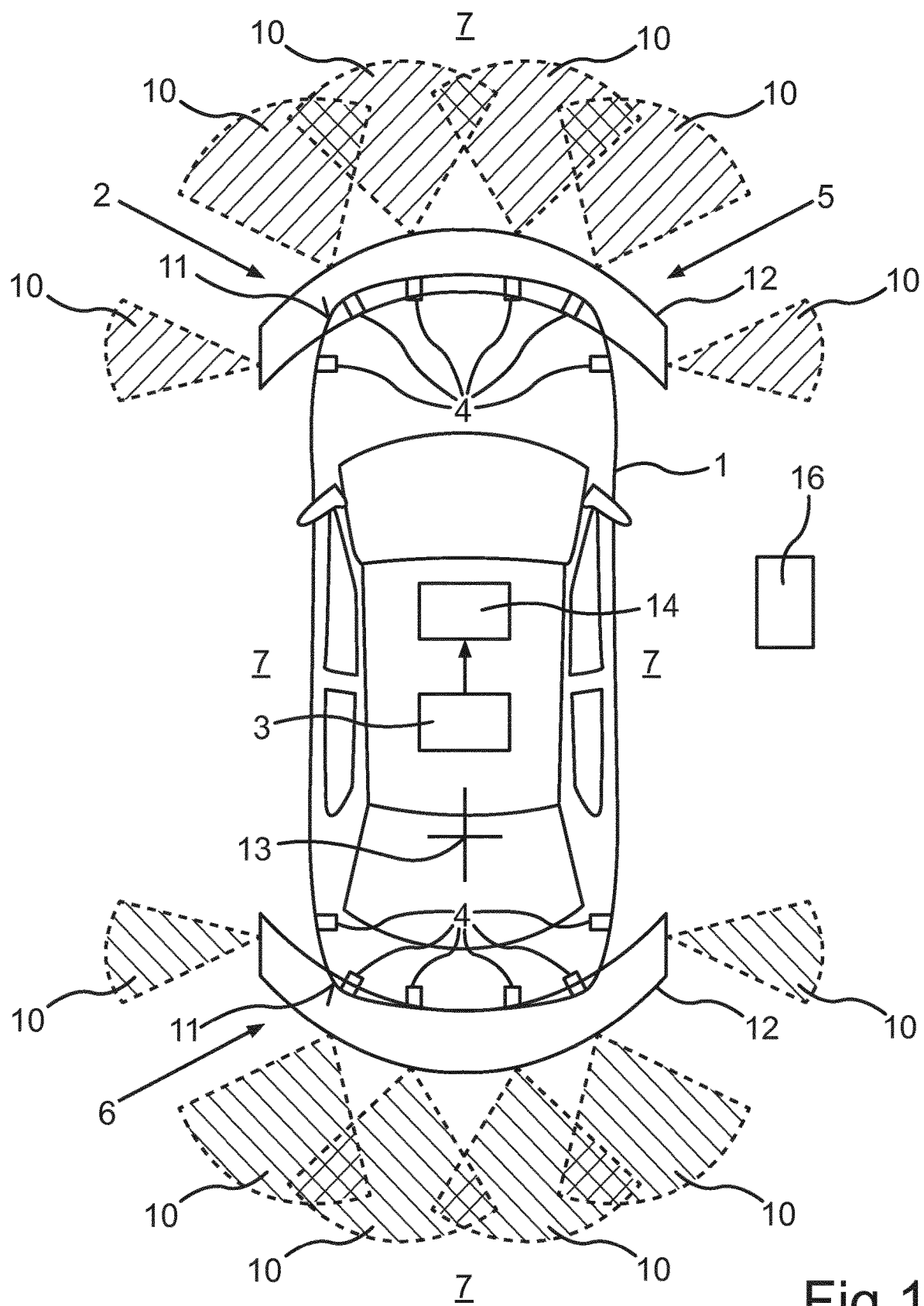
FIG. 1 shows a motor vehicle according to an embodiment of the present invention in a plan view.

FIG. 1 shows a motor vehicle 1 according to an embodiment of the present invention in a plan view. The motor vehicle 1 comprises a driver assistance system 2, which serves to assist a driver of the motor vehicle 1 during the maneuvering of the motor vehicle 1. The driver assistance system 2 comprises a control unit 3 which can be formed, for example, by an electronic control unit of the motor vehicle 1.

Furthermore, the driver assistance system 2 comprises at least one sensor 4. In the present exemplary embodiment, the driver assistance system 2 comprises twelve sensors 4, wherein six sensors 4 are arranged in a front region 5 and six sensors 4 are arranged in a rear region 6. In the present exemplary embodiment, the sensors 4 are each embodied as ultrasonic sensors. Objects 8, 9 or obstacles in a surrounding area 7 of the motor vehicle 1 can be sensed with the sensors 4. Sensor data, which describes the at least one object 8, 9 in the surrounding area 7, can be made available with the respective sensors 4. In particular, the sensor data comprises distance information which describes the distance between the sensor 4 and the object 8, 9. The sensors 4 are connected to the control unit 3 for the transmission of data. Corresponding data lines are not illustrated here for the sake of clarity.

The respective sensors 4 can transmit the sensor data to the control unit 3. The control unit 3 can then correspondingly evaluate the sensor data and determine, for example, a position of the at least one object 8, 9. In addition, the control unit 3 can determine a relative location between a reference point 13 of the motor vehicle 1 and the at least one object 8, 9. The reference point 13 is assigned here to a centre point of the rear axle of the motor vehicle 1. In addition, a digital map of the surroundings, in which the at least one object 8, 9 and its position can be input, can also be made available with the control unit 3.

Each of the sensors 4 has a detection range 10 which describes that area in which objects 8, 9 can be sensed with the sensor 4. The respective detection ranges 10 are embodied essentially in the form of a cone here. What is referred to as a blind spot 12, in which the objects 8, 9 cannot be sensed, or cannot be sensed completely, with the respective sensors 4, is formed between the detection ranges 10 and an external surface 11 of the motor vehicle 1. The spatial extent of the blind spot 12 between the sensor 4 and the detection range 10 can be approximately 30 cm in the case of the sensors 4 which are embodied as ultrasonic sensors. The spatial extent of the respective detection ranges 10 of the sensors 4 can be stored in the control unit 3. In addition, the respective installation positions of the sensors 4 can be stored in the control unit 3.

In the present example, the sensors 4 of the driver assistance system 2 are embodied as ultrasonic sensors. Alternatively or additionally, the driver assistance system 2 can have further sensors 4 which are embodied as a radar sensor, laser scanner, lidar sensor and/or as a camera. The detection range 10 of the sensor 4 depends on the type of the sensor 4. There can also be provision that the detection ranges 10 of the sensors 4 overlap.

Moreover, the driver assistance system 2 comprises an output device 14 by means of which information can be output to the driver of the motor vehicle 1 or to another vehicle occupant of the motor vehicle 1. For example, a visual, an acoustic and/or a haptic warning signal can be output by means of the output device 14.

The motor vehicle 1 is to be manoeuvred here. For this purpose, a driving tube 15 is determined in which the motor vehicle 1 is manoeuvred or moved. Such a driving tube 15 is illustrated by way of example in FIG. 2. The driving tube 15 can be determined with the control unit 3. For this purpose, the control unit 3 can use the sensor data which it has received from the sensors 4 and can determine the driving tube 15 in such a way that it is guided past the objects 8, 9 in the surrounding area 7 of the motor vehicle 1 without collisions. In the example in FIG. 2, two objects 8 and 9 which are illustrated schematically here are located in the surrounding area 7 of the motor vehicle 1. The driving tube 15 extends between the two objects 8 and 9, with the result that a collision between the motor vehicle 1 and the objects 8, 9 is prevented.

Alternatively or additionally there can also be provision that the driving tube 15 is determined on the basis of an operator control process of a vehicle-external operator control unit 16. The operator control unit 16 can be, for example, a smartphone, a radio key or the like. This vehicle-external operator control unit 16 can be operated, for example, by the driver of the motor vehicle 1 when the driver is located outside the motor vehicle 1. A control signal can then be generated by means of the operator control unit 16 as a result of the operator control input by the driver, and can be transmitted to the control unit 3 of the motor vehicle 1. The control signal can be transmitted, in particular in a wireless fashion, from the operator control unit 16 to the control unit 3. The control unit 3 can then manoeuvre the motor vehicle within the driving tube 15 on the basis of this control signal.

Figure 2:
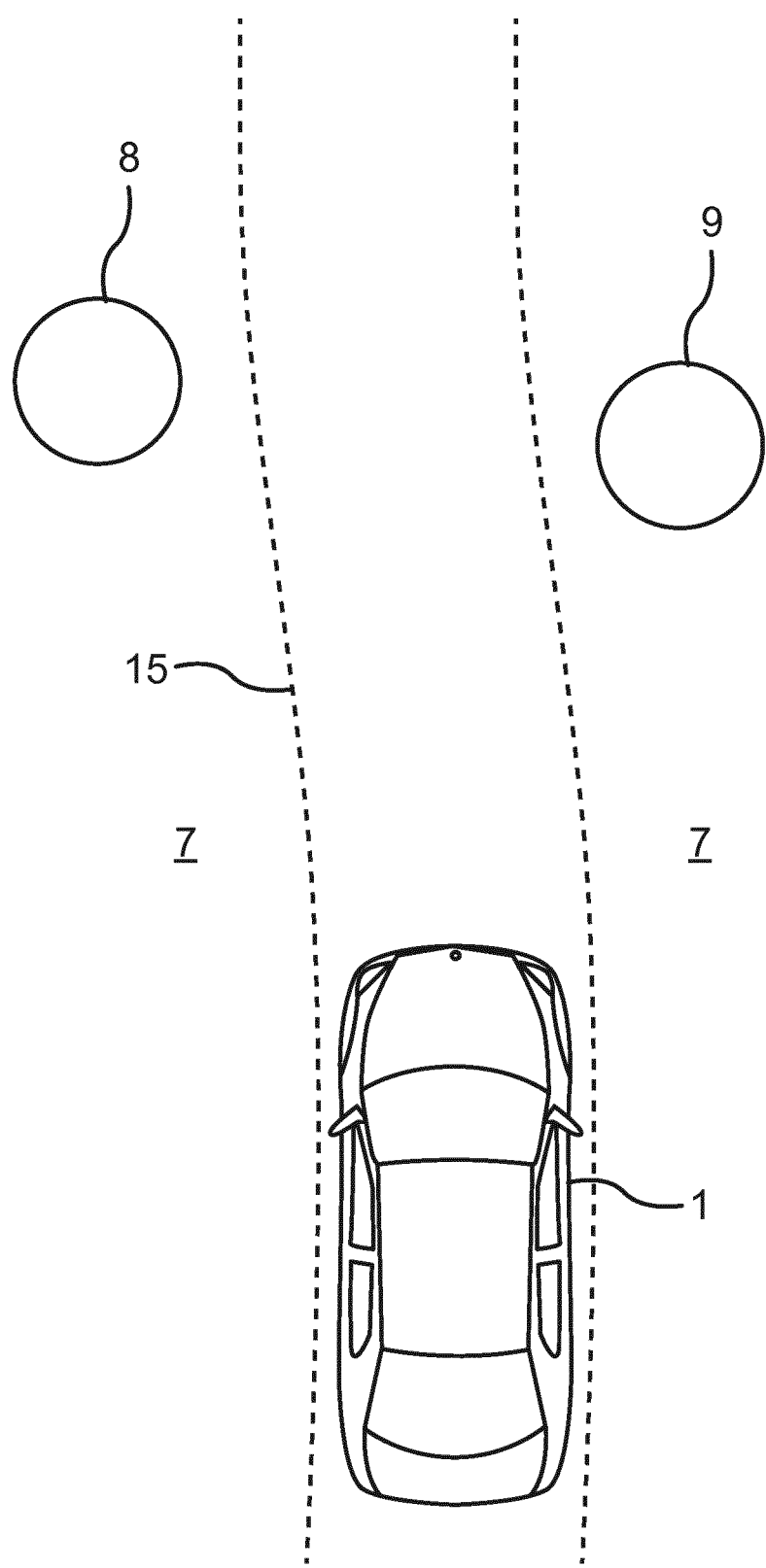
FIG. 2 shows the motor vehicle which is moved within a determined driving tube.
Figure 3:
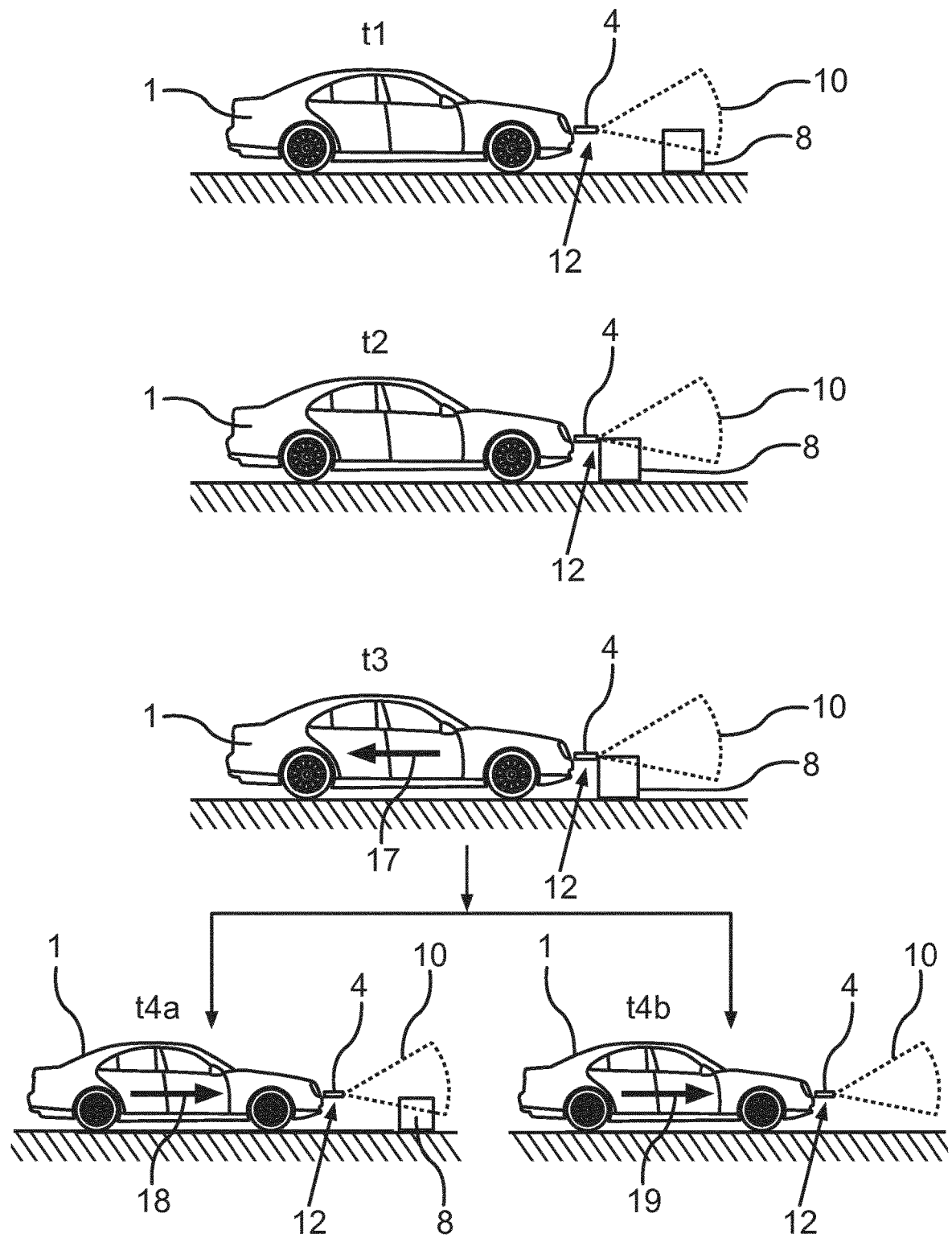
FIG. 3 shows the motor vehicle during the maneuvering in the driving tube at different times, wherein the motor vehicle is being moved in the forward direction of travel.

FIG. 3 shows the motor vehicle 1 according to FIG. 2 during the maneuvering in the driving tube 15 at different times t1, t2, t3, t4a and t4b. The motor vehicle 1 is moved here in the forward direction of travel in the driving tube. During the travel of the motor vehicle 1 within the driving tube 15, the at least one object 8, 9 is sensed continuously with the sensors 4. In addition, the relative location between the motor vehicle 1 and the at least one object 8, 9 is determined continuously by means of the control unit 3. At the time t1, the object 8 is located within the detection range 10 of one of the sensors 4. This is the case, for example, if the object 8 is a moving object which moves into the driving tube 15 during the travel of the motor vehicle 1 within the driving tube 15.

At a time t2, which follows the time t1 chronologically, the motor vehicle 1 has moved closer to the object 8. The object 8 is located here outside the detection range 10 in the blind spot 12. In the blind spot the object 8 can no longer be sensed, or no longer completely sensed, with the sensor 4. In this case, the position of the object 8 is estimated by means of the control unit 3. For example the current speed and/or the current direction of travel of the motor vehicle 1 can be used for this. In addition, the movement of the object 8 which has been sensed while the object 8 was located in the detection range 10 can be used. Therefore, an estimated value for the position of the object 8 within the blind spot 12 can be determined.

At a time t3 which follows the time t2 chronologically, the travel of the motor vehicle 1 within the driving tube 15 is interrupted by means of the control unit 3. The motor vehicle 1 is therefore braked to a standstill. A sensing position is then determined with the control unit 3, and the motor vehicle 1 is moved into said sensing position. The movement of the motor vehicle 1 to the sensing position is indicated by the arrow 17. In this context, the sensing position is determined in such a way that the estimated position of the object 8 is located in the detection range 10 if the motor vehicle 1 is located in the sensing position. In order to arrive at the sensing position, the motor vehicle 1, which has been initially moved forwards along the driving tube 15, is moved in reverse along the driving tube 15. This is clear here from the arrow 17.

If the motor vehicle 1 is located at the sensing position, basically two alternatives can arise, said alternatives being represented here as the times t4a and t4b. At a time t4a, which follows the time t3 chronologically, the motor vehicle 1 is located at the sensing position. The estimated position of the object 8 is therefore located in the detection range 10 of the sensor 4. In this context it can be checked whether the object 8 is located within the driving tube 15. If this is the case, it is possible to determine a changed driving tube along which the motor vehicle 1 is manoeuvred. If a changed driving tube cannot be identified, the driver assistance system 2 can transfer control to the driver of the motor vehicle 1. It is also possible to wait for a predetermined time period until the object 8 has been removed from the driving tube 15, or the object 8 itself has moved out of the driving tube 15.

The time t4b, which follows the time t3 chronologically, shows the alternative in which there is no object located in the detection range 10 while the motor vehicle 1 is located at the sensing position. In this case, the travel along the determined driving tube 15 can be continued. This is clear here from the arrow 19.

Figure 4:
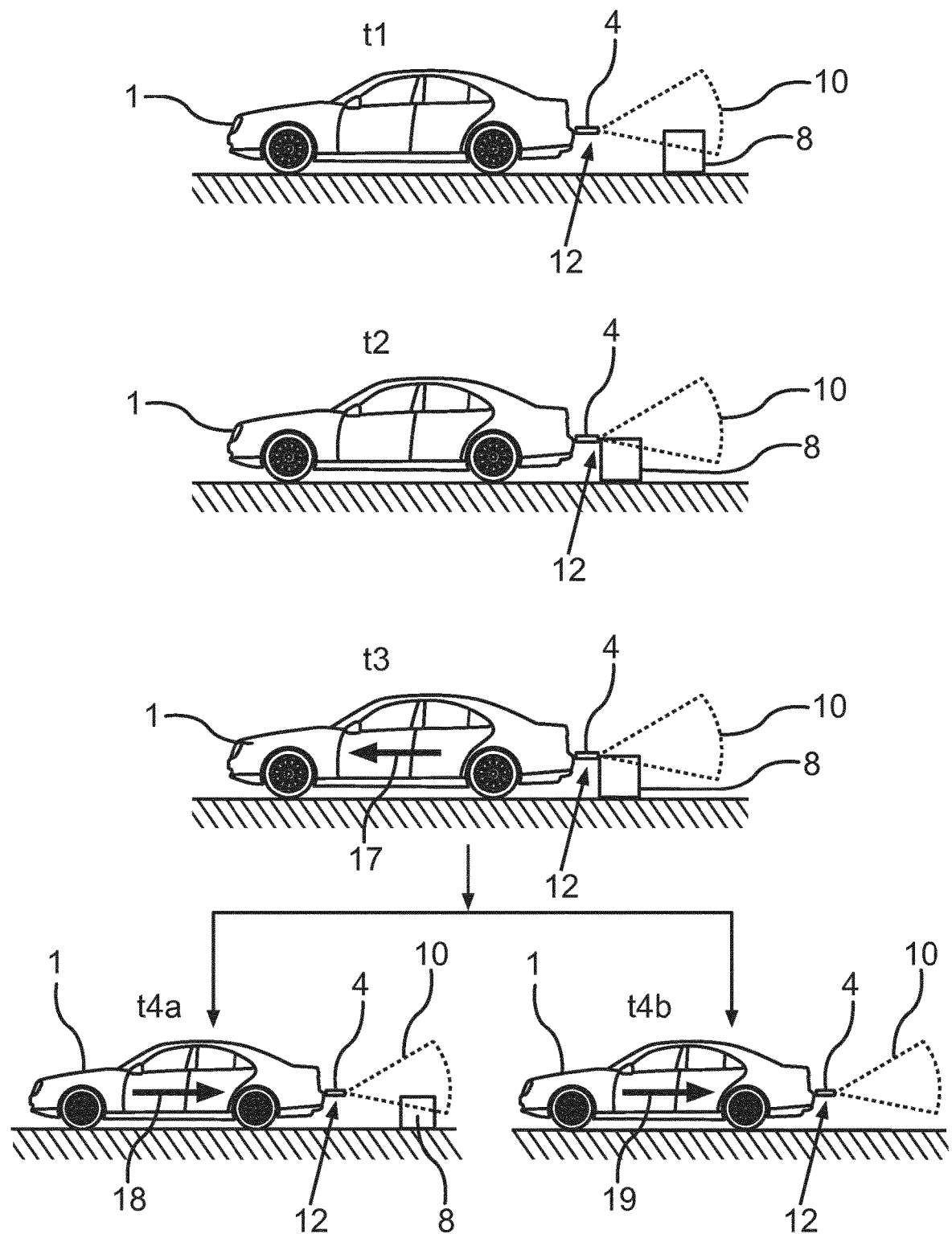
FIG. 4 shows the motor vehicle during the maneuvering in a further driving tube at the different times, wherein the motor vehicle is being moved in the reverse direction of travel.

FIG. 4 shows the motor vehicle 1 during maneuvering within a driving tube 15 according to a further embodiment. Here, the motor vehicle 1 is initially moved in reverse along the driving tube 15. At the time t1 the object 8 is located within the detection range 10 of the sensor 4. At the subsequent time t2 the object 8 is located in the blind spot 12. At the time t3, the sensing position is determined and the motor vehicle 1 is moved into the sensing position. At the time t4a the object 8 is located again in the detection range 10. As an alternative to this, the time t4b shows the case in which there is no object located within the detection range 10.

The invention claimed is:

1. A method for maneuvering a motor vehicle, comprising:
   maneuvering the motor vehicle in a first direction of travel within a determined driving tube;
   during the maneuvering, continuously determining a position of at least one object in a surrounding area of the motor vehicle by a control unit on the basis of sensor data of at least one sensor of the motor vehicle, wherein the at least one sensor has a predetermined detection range;
   when the at least one object is located outside the detection range of the at least one sensor, estimating the position of the at least one object,
   determining a sensing position by the control unit;
   moving the motor vehicle to the sensing position when the at least one object is located outside the detection range,
   wherein the sensing position is determined so that the estimated position of the at least one object is located within the detection range when the motor vehicle is located at the sensing position;
   from the sensing position, determining a current position of the object using the at least one sensor; and
   checking whether the current position of the at least one object is arranged within the determined driving tube.

2. The method according to claim 1, wherein the motor vehicle is moved to the sensing position when the at least one object is located in a predetermined blind spot of the at least one sensor, which is arranged between the detection range and an external surface of the motor vehicle.

3. The method according to claim 1, wherein the motor vehicle is moved in a second direction of travel opposite the first direction of travel to the sensing position within the determined driving tube.

4. The method according to claim 1, wherein the sensing position is determined as a function of a relative location of the motor vehicle with respect to the at least one object and the detection range of the at least one sensor.

5. The method according to claim 1, wherein the motor vehicle is moved further within the determined driving tube when the at least one object is not arranged in the determined driving tube.

6. The method according to claim 1, wherein a changed driving tube is determined, and the motor vehicle is moved within the changed driving tube when the at least one object is arranged in the determined driving tube.

7. The method according to claim 1, wherein an output is output to a driver of the motor vehicle by an output device when the at least one object is arranged in the determined driving tube.

8. The method according to claim 1, wherein the motor vehicle is maneuvered at least semi-autonomously within the determined driving tube by the control unit.

9. The method according to claim 1, wherein a control signal is received from a motor-vehicle-external operator control unit by the control unit, and the motor vehicle is maneuvered within the determined driving tube as a function of the received control signal.

10. The method according to claim 1, wherein the position of the at least one object is input into a digital map of the surroundings which describes the surrounding area of the motor vehicle.

11. A control unit for a driver assistance system of a motor vehicle, the control unit being configured to perform the method according to claim 1.

12. A driver assistance system for a motor vehicle having a control unit according to claim 11, and having at least one sensor.

13. A motor vehicle having a driver assistance system according to claim 12.

14. The method according to claim 1, further comprising determining that the at least one object is a moving object.

15. The method according to claim 14, further comprising determining that the moving object is moving out of the driving tube.

\* \* \* \* \*